United States Patent
Jacob et al.

(10) Patent No.: US 8,829,101 B2
(45) Date of Patent: Sep. 9, 2014

(54) WINDMILL PROPELLER BLADE AND METHOD OF MAKING SAME

(75) Inventors: George Jacob, Lake Jackson, TX (US); Ha Q. Pham, Lake Jackson, TX (US); Marvin L. Dettloff, Lake Jackson, TX (US); Gary A. Hunter, Lake Jackson, TX (US); Rajesh Turakhia, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 578 days.

(21) Appl. No.: 12/937,304

(22) PCT Filed: May 4, 2009

(86) PCT No.: PCT/US2009/042642
§ 371 (c)(1),
(2), (4) Date: Oct. 11, 2010

(87) PCT Pub. No.: WO2009/140087
PCT Pub. Date: Nov. 19, 2009

(65) Prior Publication Data
US 2011/0058948 A1   Mar. 10, 2011

Related U.S. Application Data

(60) Provisional application No. 61/053,697, filed on May 16, 2008.

(51) Int. Cl.
C08J 5/04 (2006.01)
F03D 1/06 (2006.01)
C08L 63/10 (2006.01)
C08L 63/00 (2006.01)
C08L 71/02 (2006.01)

(52) U.S. Cl.
CPC . *C08J 5/04* (2013.01); *F03D 1/065* (2013.01); *C08L 71/02* (2013.01); *C08J 2363/00* (2013.01); *F05C 2253/04* (2013.01); *C08J 2363/10* (2013.01); *F05B 2230/50* (2013.01); *Y02E 10/721* (2013.01); *C08L 63/10* (2013.01); *F05B 2280/6003* (2013.01); *C08L 63/00* (2013.01)
USPC .......................................... 524/494

(58) Field of Classification Search
CPC ............ C08J 5/04; C08L 63/00; C08L 63/10; F03D 1/065
USPC ........................................ 524/494
See application file for complete search history.

(56) References Cited

U.S. PATENT DOCUMENTS

| 3,804,735 A | 4/1974 | Radlove et al. |
| 3,892,819 A | 7/1975 | Najvar |

(Continued)

FOREIGN PATENT DOCUMENTS

| WO | 2004020506 | 3/2004 |
| WO | 2005097893 | 10/2005 |

(Continued)

OTHER PUBLICATIONS

Sprenger S. et al., "Rubber toughened FRC's optimized by nanoparticles" JEC-Composites, No. 19, Aug.-Sep. 2005, pp. 73-76.

(Continued)

*Primary Examiner* — Ling Choi
*Assistant Examiner* — Lanee Reuther

(57) ABSTRACT

A windmill blade which comprises reinforcing fibers in a toughened resin matrix. The resin matrix is made from a composition which comprises (a) one or more epoxy resins and/or one or more epoxy vinyl ester resins, (b) one or more reactive diluents, and (c) at least one amphiphilic block copolymer. The amphiphilic block copolymer comprises at least two different polyether blocks and is present in the composition in an amount of from about 0.5% to about 10% by volume, based on the total volume of the matrix composition.

14 Claims, 1 Drawing Sheet

(56) References Cited

U.S. PATENT DOCUMENTS

| | | | |
|---|---|---|---|
| 3,948,698 A | | 4/1976 | Elrick et al. |
| 4,014,771 A | | 3/1977 | Rosenkranz et al. |
| 4,119,609 A | | 10/1978 | Allen et al. |
| 4,824,919 A | * | 4/1989 | Baker et al. .......... 525/502 |
| 5,254,642 A | * | 10/1993 | Chang et al. .......... 525/438 |
| 8,047,798 B2 | * | 11/2011 | Bech .......... 416/230 |
| 2004/0053055 A1 | | 3/2004 | Robinson et al. |
| 2007/0265373 A1 | * | 11/2007 | Bates et al. .......... 523/436 |

FOREIGN PATENT DOCUMENTS

| WO | WO 2005097893 A1 * | 10/2005 |
|---|---|---|
| WO | 2006052726 | 5/2006 |
| WO | 2006052728 | 5/2006 |
| WO | 2007059879 | 5/2007 |

OTHER PUBLICATIONS

Whitmarsh, R.H., in Noninoic Sufactant Series; vol. 60; Marcel Dekker, N.Y., 1996, Chapter 1.

* cited by examiner

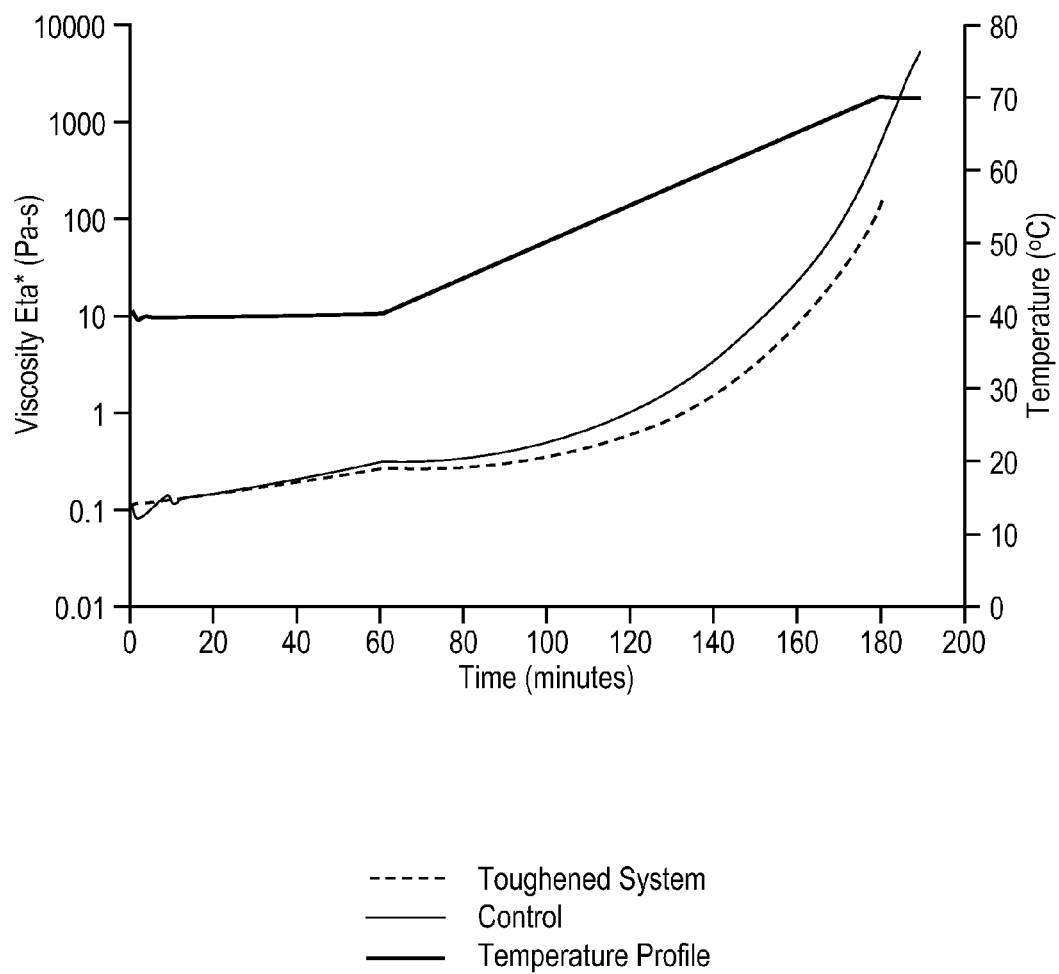

WINDMILL PROPELLER BLADE AND METHOD OF MAKING SAME

CROSS REFERENCE TO RELATED APPLICATIONS

This is a §371 application of PCT International Patent Application Number PCT/US2009/042642 filed May 4, 2009, and claims priority from provisional application Ser. No. 61/053,697 filed May 16, 2008 which is incorporated herein by reference in its entirety.

BACKGROUND OF THE INVENTION

1. Field of the Invention

The present invention relates generally to a propeller blade for a wind turbine generator (in the following simply referred to as "windmill blade") and a method of making such a windmill blade. The windmill blade comprises reinforcing fibers in a cured and toughened epoxy resin matrix.

2. Discussion of Background Information

Epoxy resins are frequently used for the production of fiber-reinforced blades of windmill propellers by a process which comprises infusing a liquid epoxy resin composition in a fiber reinforcement and thereafter curing the composition. The propellers of a wind turbine generator usually comprise three individual blades having a length of typically at least 20 meters and often up to about 40 meters or even longer (e.g., up to about 70 meters). Due to the length of the propeller blades the forces these blades are subjected to especially when they are in use (i.e., when the propeller turns) are substantial, making it desirable or even necessary to toughen the matrix epoxy resin by adding a toughening agent to the matrix resin composition.

There are many types of toughening agents for epoxy resins but all of them have a tendency to create processing issues. Specifically, reactive liquid polymers tend to have a high viscosity which means that the infusion process must be modified. For example, U.S. Patent Application Publication 2004/0053055 A1, the entire disclosure of which is incorporated by reference herein, teaches the use of liquid toughening agents but makes it clear that the resultant compositions must be heated in order to exhibit a viscosity which is suitable for processing. For example, section 0022 thereof states "The curable compositions can be used at temperature above about 100° F., or even over about 110° F. Typical operating temperatures are around about 120° F. At the above mentioned operating temperatures, the curable compositions have viscosities below about 450, or below about 400, or below about 350 [cps]." Further, obtaining these relatively low viscosities requires not just the application of a temperature above ambient temperature but also the addition of a low viscosity reactive diluent to help further reduce the viscosity of the composition which is to be infused in the reinforcing fibers.

Preformed particles such as core-shell rubbers or even inorganic particles can also be used to toughen epoxy resins. See, for example, Sprenger S. et al., "Rubber toughened FRCs optimized by nanoparticles", JEC-Composites, No. 19, August-September 2005, pp. 73-76, the entire disclosure of which is incorporated by reference herein. These particles require dispersion into an epoxy resin first, which results in viscous epoxy resins. While the final formulation can be diluted with reactive diluents to help reduce the viscosity, too much reactive diluent can lead to a reduction in mechanical properties of the article molded therefrom. Additionally, there is a chance that some of these preformed particles are filtered out of the liquid formulation during the infusion process by the fiber matrix which is a key component of the final composite blade. This can lead to a reduction in the toughness of at least parts of the composite because less toughening agent will be present in the entire thermoset system or at least parts thereof.

SUMMARY OF THE INVENTION

The present inventors have now found a class of liquid toughening agents that do not require the application of heat when the liquid toughening agents are incorporated into epoxy resin systems because the resultant systems (which include reactive diluent) exhibit a viscosity at ambient temperature that makes them suitable for use in the production of large articles such as windmill blades.

Another advantage of the toughening agents of the present invention compared to the known toughening agents is that in order to get to the desired processing viscosity at a predetermined level of toughening and at the same temperature much less reactive diluent will usually be needed with the instant toughening agents than with the known toughening agents. The significance of this advantage is that in most cases the reactive diluent will adversely affect the mechanical properties of the cured fiber-reinforced composite, therefore it is desirable to use as little reactive diluent as possible. For example, in contrast to the traditional toughening agents and flexibilizers, the liquid toughening agents of the present invention will usually provide a (significant) increase in the fracture toughness of the fiber-reinforced composite without significantly affecting the glass transition temperature of the resin and/or the modulus of the composite.

Yet another advantage of the toughening agents of the present invention is that the toughening agents will usually slow down the curing process and thus, prevent the viscosity of the composition which is being infused in the fiber reinforcement from increasing too rapidly. In this regard, it is to be appreciated that because of the large size of a windmill blade it is necessary to give the resin composition a substantial amount of time to completely infuse in the reinforcing fiber matrix. If the epoxy resin composition cures too rapidly, the composition will not be able to completely penetrate the interstices of the fibers before the composition becomes too viscous for further penetration, thereby giving rise to empty spaces within the fiber reinforcement and a resultant weakening of the blade. It is expected that the toughening agents of the present invention will show their advantageous properties also in combination with other resins which may be used as matrix resins for the production of windmill blades such as, for example, epoxy vinyl ester resins.

The present invention provides a windmill blade which comprises reinforcing fibers in a toughened resin matrix. The matrix is made from a curable composition which comprises (a) one or more epoxy resins and/or one or more epoxy vinyl ester resins, (b) one or more reactive diluents, and (c) one or more toughening amphiphilic block copolymers (i.e., block copolymers which comprise both one or more epoxyphilic blocks and one or more epoxyphobic blocks). The amphiphilic block copolymers comprise at least two different polyether blocks and are present in the composition in an amount of from about 0.5% to about 10% by volume, based on the total volume of the composition.

In one aspect, component (c) may be present in the composition in an amount of not more than about 5% by volume and/or not less than about 1% by volume. In one embodiment, compared (c) may be present in the composition in an amount of from at least about 1% by volume to about 5% by volume based on the total volume of the composition.

In another aspect, component (b) may be present in the composition in an amount of from about 5% to about 25% by volume and/or component (a) may be present in an amount of from about 30% to about 95% by volume, each based on the total volume of the composition.

In yet another aspect, the matrix composition may provide a fracture toughness of an article made therefrom which is higher than the fracture toughness of an article made from a comparative composition which has the same initial viscosity as the matrix composition and comprises components (a) and (b) but no component (c). For example, the fracture toughness (as determined, for example, by ASTM D 5045-93 which is incorporated by reference herein in its entirety) of the article made from the matrix composition may be at least about 150%, e.g., at least about 200%, or at least about 250% of the fracture toughness of the article made from the comparative composition. Additionally, the viscosity of the matrix composition may increase at a rate which is about the same or lower than the rate at which the viscosity of the comparative composition increases under the same conditions.

In a still further aspect, component (c) of the matrix composition may comprise one or more amphiphilic block copolymers which comprise at least one polyether block A which comprises one or more alkylene oxide monomer units having at least 4 carbon atoms (hereinafter sometimes referred to as "block copolymers I"). For example, the one or more block copolymers I may comprise one or more polyether blocks A which are independently selected from a polybutylene oxide block, a polyhexylene oxide block, a polydodecylene oxide block, and a polyhexadecylene oxide block.

In another aspect, the one or more block copolymers I may comprise at least one polyether block B which comprises one or more alkylene oxide monomer units having 2 or 3 carbon atoms. For example, the one or more block copolymers I may comprise one or more polyether blocks B which are independently selected from a polyethylene oxide block, a polypropylene oxide block, and a poly(ethylene oxide-co-propylene oxide) block.

In yet another aspect, the one or more block copolymers I may comprise at least one block A of poly(butylene oxide) and at least one block B of poly(ethylene oxide) and/or the one or more block copolymers I may comprise one or both of a poly(ethylene oxide)-b-poly(butylene oxide) block copolymer and a poly(ethylene oxide)-b-poly(butylene oxide)-b-poly(ethylene oxide) triblock copolymer.

In another aspect, the weight ratio of the one or more blocks A and the one or more blocks B in the one or more block copolymers I may be from about 10:1 to about 1:10.

In another aspect of the windmill blades of the present invention, component (c) may comprise (e.g., in addition to or instead of the one or more block copolymers I) one or more block copolymers which are poly(ethylene oxide)-poly(propylene oxide) block copolymers comprising from about 70% to about 95% by weight of one or more poly(propylene oxide) blocks and from about 5% to about 30% by weight of one or more poly(ethylene oxide) blocks, based on the total weight of the block copolymers (hereinafter sometimes referred to as "block copolymers II"). For example, the one or more block copolymers II may comprise not more than about 20% by weight of the one or more poly(ethylene oxide) blocks.

In another aspect of the windmill blade of the present invention, the at least one amphiphilic block copolymer may have a number average molecular weight (Mn) of from about 1,000 to about 30,000.

In another aspect, component (a) of the matrix composition may comprise one or more epoxy resins, for example, one or more epoxy resins selected from polyglycidyl ethers of polyhydric alcohols, polyglycidyl ethers of polyhydric phenols, polyglycidyl amines, polyglycidyl amides, polyglycidyl imides, polyglycidyl hydantoins, polyglycidyl thioethers, epoxidized fatty acids or drying oils, epoxidized polyolefins, epoxidized di-unsaturated acid esters, and epoxidized unsaturated polyesters. For example, component (a) may comprise at least one polyglycidyl ether of a polyhydric phenol such as, e.g., a diglycidyl ether of a bisphenol compound (for example, biphenol A or bisphenol F).

In yet another aspect, the one or more epoxy resins may have an epoxide equivalent weight of from about 100 to about 3,000 and/or a viscosity at 25° C. of at least about 1,000 cps.

In another aspect of the windmill blade of the present invention, component (a) of the matrix composition may comprise one or more epoxy vinyl ester resins. For example, the one or more epoxy vinyl ester resins may have a viscosity at 25° C. of at least about 1,000 cps.

In a still further aspect, component (b) of the matrix composition may have a viscosity at 25° C. which is not higher than about 100 cps.

In another aspect, the matrix composition may have a viscosity at 25° C. which is not higher than about 500 cps.

In an aspect, the matrix composition may further comprise one or more curing agents.

In another aspect of the windmill blade of the present invention, the reinforcing fibers may comprise one or more of carbon fibers, graphite fibers, boron fibers, quartz fibers, aluminum oxide fibers, glass fibers, silicon carbide fibers, and aramid fibers and/or the reinforcing fibers may be present in an amount of from about 5% to about 80% by weight, based on the total weight of reinforcing fibers plus matrix.

In yet another aspect, the windmill blade may have a length of at least about 20 meters (e.g., a length of at least about 30 meters or a length of at least about 40 meters).

The present invention also provides a toughened resin matrix composition for making a fiber-reinforced windmill blade as set forth above (including the various aspects thereof).

The present invention also provides a method of making a windmill blade; wherein the method comprises (i) combining reinforcing fibers with a curable resin matrix composition, and (ii) curing the matrix composition.

The matrix composition comprises (a) one or more epoxy resins and/or one or more epoxy vinyl ester resins, (b) one or more reactive diluents, (c) at least one amphiphilic block copolymer and (d) one or more curing agents. Component (c) of the matrix composition comprises at least two different polyether blocks and is present in an amount of from about 0.5% to about 10% by volume, based on the total volume of the matrix composition.

In one aspect, the method may comprise infusing the matrix composition in the reinforcing fibers. For example, the reinforcing fibers may be in a dry state prior to the matrix composition being infused therein.

In another aspect of the method, the matrix composition may be at a temperature of not higher than about 40° C., e.g., not higher than about 30° C., at the time of infusion.

In another aspect, the method may comprise thermal curing of the matrix composition, for example, at a temperature of from about 30° C. to about 150° C.

Other features and advantages of the present invention will be set forth in the description of the present invention that follows, and will be apparent, in part, from the description or may be learned by practice of the present invention. The present invention will be realized and attained by the compositions, products, and methods particularly pointed out in the written description and claims hereof.

BRIEF DESCRIPTION OF THE DRAWINGS

The present invention is further described in the detailed description which follows, in reference to the drawing by way of non-limiting examples of exemplary embodiments of the present invention, wherein the only FIG. 1 represents a graph of viscosity versus curing time and temperature of the matrix compositions described in Examples 1 and 2 below.

DETAILED DESCRIPTION OF THE PRESENT INVENTION

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show embodiments of the present invention in more detail than is necessary for the fundamental understanding of the present invention, the description making apparent to those skilled in the art how the several forms of the present invention may be embodied in practice.

Non-limiting examples of polyether block copolymers I which are suitable for use as at least a part of component (c) of the matrix composition of the present invention include polyether block copolymers which comprise at least one polyether block B derived from an alkylene oxide such as ethylene oxide (EO) and/or propylene oxide (PO) and at least one polyether block A derived from an alkylene oxide having at least 4 and preferably not more than about 20 (e.g., not more than about 16, or not more than about 12) carbon atoms such as, for example, 1,2-epoxy butane, known commonly as butylene oxide (BO). The block A may also be comprised of mixtures of C4 or higher carbon analog monomers that are copolymerized together to provide the block A. The block A may also contain lower molecular weight co-monomers such as EO. Non-limiting examples of corresponding block copolymers I are described in, e.g., WO 2006/052726, the entire disclosure of which is expressly incorporated by reference herein.

The block copolymers I may contain more than two polyether blocks. Non-limiting examples of corresponding block copolymers I include a diblock copolymer (BA); a linear triblock copolymer (BAB or ABA), a linear tetrablock copolymer (ABAB); a higher order multiblock copolymer $(ABAB)_xA$ or $(BABA)_xB$, where x is an integer value ranging from about 1 to about 3; a branched block copolymer; a star block copolymer; and any combination thereof. The amphiphilic polyether block copolymers comprising branched block structures or star block structures comprise at least one block A and at least one block B.

Non-limiting examples of the block B include a polyethylene oxide block, a propylene oxide block, a poly(ethylene oxide-co-propylene oxide) block, a poly(ethylene oxide-ran-propylene oxide) block, and mixtures thereof. Preferably, the amphiphilic copolymers for use in the present invention comprise at least one block B which is a polyethylene oxide block.

Generally, the polyether block A of the copolymers I for use as or part of component (c) of the compositions of the present invention will comprise units of an epoxidized alpha-olefin having from 4 to about 20 carbon atoms. Non-limiting examples of the block A include a polybutylene oxide block, a polyhexylene oxide block, a polydodecylene oxide block, a polyhexadecylene oxide block, and mixtures thereof. Other examples of the alkylene oxide blocks A may include those based on Vikolox™ epoxidized alpha olefins, including C10-C30+ olefins, commercially available from Arkema. Preferably, the amphiphilic block copolymers I for use in the present invention comprise at least one polybutylene oxide block.

Of course, when a polyether block copolymer I has a multiblock copolymer structure, other block segments in addition to blocks A and B may be present in the block copolymer. Non-limiting examples of other blocks of the block copolymers I include polyethylene, polymethyl acrylate, and mixtures thereof as well as polyethylene propylene (PEP), polybutadiene, polyisoprene, polydimethyl siloxane, polyalkyl methyl methacrylate, such as polyethyl hexyl methacrylate, and mixtures thereof.

The composition of the block copolymers I for use in the present invention will usually range from about 90 weight percent polyalkylene oxide block A and about 10 weight percent polyalkylene oxide block B to about 10 weight percent polyalkylene oxide block A and about 90 weight percent polyalkylene oxide block B.

The viscosity of the block copolymers I (and the block copolymers II) for use in the present invention is not critical and may vary over a wide range. For example, the kinematic viscosity of these block copolymers at 25° C. may be as high as about 4,000 cps (4,000 mPa·s) or even higher and as low as about 100 cps or even lower. In this regard, the values of the kinematic viscosity indicated in the present specification and the appended claims may be measured according to ASTM D445-06, which is incorporated by reference herein in its entirety.

The block copolymers II set forth above differ from the above block copolymers I mainly in that they do not have to contain at least one polyether block A which is derived from an alkylene oxide having at least 4 carbon atoms. Instead, they contain a relatively high percentage (at least about 70%, e.g., at least about 80%, at least about 85%, or at least about 90% by weight) of one or more poly(propylene oxide) blocks. Non-limiting examples of commercially available block copolymers II include Pluronic L121 and Pluronic 31R, both available from BASF. Both are characterized by comprising a relatively low concentration of PEO. Pluronic L121 is a PEO-PPO-PEO triblock copolymer containing about 10% by weight of PEO and having an average molecular weight of about 4,400 and a viscosity at 25° C. of 1,200 cps. Pluronic 31R is a PPO-PEO-PPO triblock copolymer containing about 10% of weight of PEO and having an average molecular weight of about 3,250 and a viscosity at 25° C. of 660 cps. The one or more block copolymers II can be used either alone or in combination with other amphiphilic polyether block copolymers (e.g., one or more block copolymers I as set forth above) as component (c) of the compositions of the present invention. Further, like the block copolymers I, the block copolymers II may be diblock, triblock, tetrablock or higher multiblock copolymers; they may, for example, be linear, branched, star-shaped, and any combination thereof.

The amphiphilic polyether block copolymers (c) for use in the present invention will often have a number average molecular weight (Mn) which is at least about 1,000, e.g., at least about 2,000, or at least about 3,000, but usually not higher than about 30,000, e.g., not higher than about 25,000, or not higher than about 20,000.

Small amounts of homopolymers from each of the respective block segments may be present in the final amphiphilic polyether block copolymers for use in the present invention. For example, from about 1 volume percent to about 50 volume percent, preferably from about 1 volume percent to about 10 volume percent, of a homopolymer that is similar or identical in structure with the block(s) A or the block(s) B of the block copolymers I can be present in the composition of the present invention comprising the components (a) to (c).

The most advantageous amount of amphiphilic block copolymers (c) employed in the matrix composition of the present invention depends on a variety of factors including the equivalent weight of the polymers, as well as the desired properties of the windmill blade that is to be made from the composition. In general, the amount of amphiphilic block copolymers (c) employed in the present invention will be at least about 0.5%, e.g., at least about 1%, or at least about 2%, but not higher than about 10%, e.g., not higher than about 8%, not higher than about 6%, or not higher than about 5% by volume, based on the total volume of the matrix composition. The block copolymer(s) (c) may be combined with the remaining components of the matrix composition in various forms, e.g., either as such or in the form of a masterbatch.

In addition to one or more polyether block copolymers I the matrix composition of the present invention may comprise one or more other (secondary) amphiphilic block copolymers. Non-limiting examples thereof include poly(ethylene oxide)-b-poly(ethylene-alt propylene) (PEO-PEP), poly(isoprene-ethylene oxide) block copolymers (PI-b-PEO), poly(ethylene propylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide-b-methylmethacrylate) block copolymers (PI-b-PEO-b-PMMA); and mixtures thereof. Generally, the amount of these secondary amphiphilic block copolymers, if present at all, is from about 0.1%, e.g., from about 1% percent, to about 30%, e.g., to about 20%, or to about 10% by volume, based on the total volume of the matrix composition.

As an illustration of one embodiment of the present invention, an epoxy resin (a) may be blended with a polyether block copolymer (c), for example, a poly(ethylene oxide)-b-poly (butylene oxide) (PEO-PBO) diblock copolymer wherein the PBO is an epoxy resin immiscible epoxyphobic block A of the diblock copolymer and the PEO is an epoxy resin miscible block B of the diblock copolymer.

The PEO-PBO block copolymer can be represented generally by the chemical formula $(PEO)_x$-$(PBO)_y$ wherein the subscripts x and y represent the number of monomer units of polyethylene oxide and polybutylene oxide in each block, respectively and are positive numbers. In many cases the subscripts x and y will each be from about 15 to about 85 and the molecular weight of the structural part $(PEO)_x$ will be from about 750 to about 100,000 and the molecular weight represented by the structural part (PBO) will be from about 1,000 to about 30,000.

Also, a single PEO-PBO diblock copolymer may be used alone, or two or more PEO-PBO diblock copolymers may be combined. In one embodiment of the composition of the present invention, a PEO-PBO diblock copolymer is used wherein the diblock copolymer has from about 20 weight percent PEO and about 80 weight percent PBO to about 80 weight percent PEO and 20 weight percent PBO; and has block sizes of molecular weights (Mn) of PBO of about 2000 or higher and molecular weights of PEO of about 750 or higher.

In general, the amphiphilic block copolymers (c) used in the present invention can be prepared in a single synthetic process, wherein one monomer is polymerized to prepare an initial block, followed by simple introduction of the second monomer type which is then polymerized onto the terminus of the first block until the polymerization process is complete. It is also possible to make the blocks separately, preparing the first block and then polymerizing the second block onto the terminus of the first block in a second synthetic step. The difference in solubility of the two block fragments is sufficient that the block copolymer may be used to modify a variety of resin materials. The block copolymers (c) can be prepared, for example, by Group I metals, such as sodium, potassium or cesium moderated anionic polymerization. The polymerization can be carried out neat or using a solvent. The temperature of the polymerization reaction can be, for example, from about 70° C. to about 140° C. at atmospheric pressure to slightly above atmospheric pressure. The synthesis of the block copolymers (c) may be carried out, for example, as described in Whitmarsh, R. H., in Nonionic Surfactants Polyoxyalkylene Block Copolymers; Nace, V. M., Ed.; Surfactant Science Series; Vol. 60; Marcel Dekker, N.Y., 1996; Chapter 1, the entire disclosure of which is incorporated by reference herein. In a preferred embodiment, the block segments of the block copolymers (c) are prepared by the ring-opening polymerization of 1,2-epoxy alkenes.

Epoxy resins which are suitable for use as component (a) or a part thereof of the matrix composition of the present invention include a wide variety of epoxy compounds. Typically, the epoxy compounds are epoxy resins which are also referred to as polyepoxides. The polyepoxides that are useful herein can be monomeric (for example, the diglycidyl ether of bisphenol A, the diglycidyl ether of bisphenol F, novolac-based epoxy resins, and tris-epoxy resins), higher molecular weight advanced resins (for example, the diglycidyl ether of bisphenol A advanced with bisphenol A) or polymerized unsaturated monoepoxides (for example, glycidyl acrylate, glycidyl methacrylate, allyl glycidyl ether, etc.), homopolymers or copolymers. Most desirably, the epoxy resins contain, on average, at least one (and preferably at least two) pendant or terminal 1,2-epoxy groups (i.e., vicinal epoxy groups) per molecule.

Non-limiting examples of epoxy resins which are suitable for use in the present invention include the polyglycidyl ethers of both polyhydric alcohols and polyhydric phenols;

polyglycidyl amines; polyglycidyl amides; polyglycidyl imides; polyglycidyl hydantoins; polyglycidyl thioethers; epoxidized fatty acids or drying oils, epoxidized polyolefins; epoxidized di-unsaturated acid esters; epoxidized unsaturated polyesters; and mixtures thereof. Non-limiting examples of polyepoxides prepared from polyhydric phenols include those which are disclosed, for example, in U.S. Pat. No. 4,431,782, the entire disclosure of which is incorporated by reference herein. Polyepoxides can be prepared from, e.g., mono-, di- and tri-hydric phenols, and can include the novolac resins. Polyepoxides can also include epoxidized cyclo-olefins; as well as the polymeric polyepoxides which are polymers and copolymers of glycidyl acrylate, glycidyl methacrylate and allylglycidyl ether. Non-limiting examples of suitable polyepoxides are also disclosed in U.S. Pat. Nos. 3,804,735; 3,892,819; 3,948,698; 4,014,771 and 4,119,609; and Lee and Neville, Handbook of Epoxy Resins, Chapter 2, McGraw Hill, N.Y. (1967), the entire disclosures of which are incorporated by reference herein.

Further resins which are suitable for use as component (a) or at least a part thereof of the matrix resin composition of the present invention include epoxy vinyl ester resins such as those which are described in, e.g., WO 2006/052728, WO 2005/097893, and U.S. Pat. No. 6,329,475, the entire disclosures of which are incorporated by reference herein. Specific non-limiting examples of epoxy vinyl ester resins (which can be employed as component (a) either alone or in combination with one or more epoxy resins such as, e.g., those set forth above) include the epoxy vinyl ester resins which are supplied by Ashland, Inc. under the trademark DERAKANE. An example of these epoxy vinyl ester resins is represented by the general purpose resin known as DERAKANE 411-350 epoxy vinyl ester resin, which contains approximately 45 percent monomeric styrene. Other DERAKANE epoxy vinyl ester resins which can be employed in the present invention include, for example, DERAKANE 411-C-50 epoxy vinyl ester resin containing approximately 50 percent monomeric styrene; DERAKANE 470-36 epoxy vinyl ester resin containing approximately 36 percent monomeric styrene; DERAKANE 470-300 epoxy vinyl ester resin containing approximately 33 percent monomeric styrene; DERAKANE 510-C-350 epoxy vinyl ester resin, a brominated vinyl ester resin containing approximately 33 percent monomeric styrene; DERAKANE 790 epoxy vinyl ester resin containing approximately 45 percent monomeric styrene; DERAKANE 8084 epoxy vinyl ester resin, and a flexibilized epoxy vinyl ester resin containing approximately 40 percent monomeric styrene.

While epoxy resins (and epoxy vinyl ester resins) in general can be used as component (a) in the matrix composition of the present invention, preferred epoxy resins for use in the present invention include glycidyl polyethers of polyhydric alcohols or polyhydric phenols having an epoxide equivalent weight (EEW) of from about 100 to about 3,000, preferably from about 150 to about 2,000. These epoxy resins are usually made by reacting at least two moles of an epihalohydrin or glycerol dihalohydrin with one mole of the polyhydric alcohol or polyhydric phenol, and a sufficient amount of a caustic alkali to combine with the halohydrin. The products are characterized by the presence of more than one epoxide group, that is, a 1,2-epoxy equivalency of greater than one.

Further non-limiting examples of epoxy resins for use as (or as part of) component (a) of the present invention also include cycloaliphatic diene-derived epoxides. These polyepoxides can be cured either thermally, cationically or by photoinitiation (for example, by UV initiated cure). Non-limiting examples thereof include 3,4-epoxycyclohexylmethyl-3,4-epoxycyclohexyl carboxylate; 1,2-epoxy-4-vinyl-cyclohexane; bis(7-oxabicyclo[4.1.0]-hept-3-ylmethyl hexanedioic acid ester; 3,4-epoxycyclohexanecarboxylate methyl ester; and mixtures thereof.

Epoxy compounds also represent non-limiting examples of reactive diluent components (b) for use in the present invention in combination with epoxy resins as (or as part of) component (a). Examples of these epoxide reactive diluents include monoepoxides, such as butyl and higher aliphatic glycidyl ethers, phenyl glycidyl ether, and cresyl glycidyl ether. The reactive diluents (b) are employed to reduce the working viscosity of the matrix composition, and to give better wetting properties to the formulation. Of course, polyepoxides and in particular, diepoxides may also be used as epoxide reactive diluents (b) as long as they have a desirably low viscosity, for example, a viscosity at 25° C. that is not higher than about 100 cps, e.g., not higher than about 50 cps, not higher than about 25 cps, not higher than about 20 cps, or not higher than about 10 cps. Non-limiting examples of diepoxides which are suitable for use in component (b) include alkanediol diglycidyl ethers such as, e.g., 1,4-butanediol diglycidyl ether. Of course, one or more compounds with a desirably low viscosity which are different from an epoxy compound may be used as reactive diluent (b) as well (optionally, in combination with one or more epoxide reactive diluents).

Non-limiting examples of reactive diluents (b) for use with an epoxy vinyl ester resin as (or as part of) component (a) include styrene, chlorostyrenes; methyl styrenes such as s-methyl styrene and p-methyl styrene; vinyl benzyl chloride, divinyl benzene, indene, allyl styrene, allyl benzene; unsaturated esters such as methyl methacrylate, methyl acrylate and other lower aliphatic esters of acrylic and methacrylic acids; allyl acetate, diallyl phthalate, diallyl succinate, diallyl adipate, diallyl sebacate, diethylene glycol bis(allyl carbonate), triallyl phosphate and diethylene glycol bis(allyl carbonate); triallyl phosphate and other allyl esters; vinyl toluene, diallyl chloroendate, diallyl tetrachlorophthalate, ethylene glycol diethacrylate; amides such as acrylamides; and vinyl chloride. These reactive diluents can be employed individually or as a combination of two or more thereof.

Generally, the amount of matrix resin (a) used in the matrix composition of the present invention may be from about 30 weight percent to about 95 weight percent, based on the total weight of the matrix composition. Often component (a) will be present in an amount of at least about 50%, e.g., at least about 60%, at least about 70%, or at least about 80% by weight, and not higher than about 90% by weight.

Further, component (a) of the matrix composition will often have a viscosity at 25° C. of at least about 1,000 cps, e.g., at least about 2,000 cps, at least about 3,000 cps, at least about 4,000 cps, at least about 5,000 cps, at least about 6,000 cps, at least about 7,000 cps, or at least about 8,000 cps.

The curable matrix composition of the present invention will usually also comprise one or more curing agents (sometimes also referred to as hardeners or cross-linking agents). Useful as curing agent in the present invention may be any compound which comprises at least one group which is reactive with a functional group of the resin (a) such as, e.g., an epoxy group of an epoxy resin or an ethylenically unsaturated group of the epoxy vinyl ester resin. The chemistry of such curing agents is described in the previously referenced books on epoxy resins. Non-limiting examples of curing agents for use in the present invention in combination with epoxy resins as (or as part of) component (a) include nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases, and combinations of two or more of the above curing agents. Polyamines, dicyandiamide, diaminodiphenylsulfone and their isomers, aminobenzoates, various acid anhydrides, phenol-novolac resins and cresol-novolac resins are examples of preferred curing agents for use in the present invention. Further non-limiting examples of suitable curing agents for use in the present invention include the polyether polyamine curing agents disclosed in WO 2004/020506, the entire disclosure of which is incorporated by reference herein.

Generally, the amount of curing agent may be from about 1 weight percent to about 70 volume percent, based on the total volume of the matrix composition. As an optional component useful in the present invention, one or more curing catalysts can be added to the matrix composition. Non-limiting examples of curing catalysts include imidazole derivatives such as 2-ethyl-4-methyl imidazole; tertiary amines; and organic metallic salts. Generally, the curing catalyst(s) is/are used in an amount of from 0 to about 6 parts by volume, based on the total volume of the curable composition.

Non-limiting examples of curing agents for use in combination with an epoxy vinyl ester resin as (or as part of) component (a) include free radical initiators, such as azo compounds including azoisobutyronitrile, and organic peroxides, such as tertiary-butyl perbenzoate, tertiary-butyl peroctoate, benzoyl peroxide; methyl ethyl ketone peroxide, acetoacetic peroxide, cumene hydroperoxide, cyclohexanone hydroperoxide, and dicumyl peroxide. Preferably, the catalyst is used in an amount of from 0.03 to 2.5 parts by weight based on the total weight of the matrix resin composition.

Non-limiting examples of materials which are suitable for use in the fiber reinforcement of the windmill blade of the present include fibers made from carbon/graphite, boron, quartz, aluminum oxide; Aramid; glass such as, e.g., E glass, S glass, S-2 glass or C glass; and silicon carbide fibers and titanium-containing silicon carbide fibers. Examples of commercially available fibers which can be used for the purposes of the present invention include organic fibers, such as KEVLAR™ from DuPont; aluminum oxide-containing fibers, such as NEXTEL™ fibers from 3M; silicon carbide fibers, such as NICALON™ from Nippon Carbon; and titanium containing silicon carbide fibers, such as TYRRANO™ from Ube. Of course, a combination of fibers made from different materials may be used as well, for example, a combination of glass and carbon fibers (hybrids).

Preferred examples of reinforcing materials for use in the windmill blades of the present invention include carbon fibers and fibers comprising carbon in combination with other materials such as glass. Carbon (and other) fibers generally are supplied in a number of different forms, from continuous filament tows to chopped fibers and mats. The fibers can be unidirectional or multidirectional. The tows of continuous filament carbon usually contain from about 1,000 to about 75,000 individual filaments, which can be woven or knitted into woven roving and hybrid fabrics with glass fibers and aramid fibers. By way of non-limiting example, the fiber reinforcing materials (e.g., carbon fibers) useful for the windmill blade of the present invention may be in the form of woven fabric, cloth, mesh, web, and/or fibers, or in the form of a cross-ply laminate of unidirectionally oriented parallel filaments.

The curable resin matrix composition according to the present invention may optionally contain additives such as, e.g., fillers, dyes, pigments, thixotropic agents, wetting agents, surfactants, fluidity control agents, stabilizers, and solvents. Resins different from epoxy and epoxy vinyl ester resins (e.g., unsaturated polyesters) may also be present as optional components. The amount of the optional additives used in the resin composition generally may be from 0 weight percent to about 70 weight percent, depending on the final formulation.

In the preparation of the matrix composition of the present invention, the components may be mixed together by known means at conditions to form a curable composition in liquid form. The final composition will usually have a viscosity at 25° C. of not higher than about 1000 cps, e.g., not higher than about 700 cps, not higher than about 500 cps, not higher than about 400 cps, or not higher than about 350 cps. The curable resin matrix composition of the present invention can be produced by mixing all of the components of the composition together in any order. Alternatively, the curable resin composition of the present invention can be produced by preparing a first composition comprising components (a) to (c) and a second composition comprising the curing agent component. All other components useful in making the matrix composition may be present in the same composition, or some may be present in the first composition, and some in the second composition. The first composition may then be mixed with the second composition to form the curable matrix composition. The curable matrix composition may then be contacted with (preferably infused in) the fiber reinforcement and cured to produce a thermoset material in the form of a windmill blade.

Optionally, a neutral solvent may be employed in the blend to facilitate homogeneous mixing of the components thereof, although this is not preferred. Non-limiting examples of solvents for use in the present invention include acetone and methyl ethyl ketone (MEK).

An alternative method of combining component (c) (and optionally component (b)) with component (a) of the matrix composition of the present invention comprises incorporating component (c) (and optionally component (b)) directly into a resin advancement reactor during the resin manufacturing step. In this embodiment, the composition of the present invention includes, for example, a liquid epoxy resin such as, e.g., a diglycidyl ether of bisphenol A, a polyhydric alcohol such as, e.g., bisphenol-A and an amphiphilic block copolymer such as, e.g., an EO/BO block copolymer and/or an PEO-PBO-PEO triblock copolymer.

If the processing of the resin includes an advancement step, another method of making the matrix composition of the present invention comprises adding component (c) (and optionally component (b)) to the reactants prior to the advancement reaction.

Still another alternative method of making the matrix composition of the present invention comprises incorporating component (c) into the curing agent used to cure component (a).

Time and temperature of the mixing process are not critical, but generally the components will be combined at a temperature of from about 10° C. to about 60° C., preferably from about 20° C. to about 50° C., and more preferably from about 30° C. to about 40° C. for a sufficient time period until substantially complete homogeneity is achieved.

The fiber reinforcement and the matrix composition can be combined in any way. Typically, an infusion process will be used. Non-limiting examples of other possible processes include resin transfer molding (RTM) and vacuum assisted resin transfer molding (VARTM).

As an illustration of the process of the present invention, the matrix composition may be at a temperature of not higher than about 40° C. at the time it is infused in the reinforcing fibers.

The matrix composition of the present invention may be cured in known manner. The curing temperature (for thermal curing) will generally be not lower than about 30° C., e.g., not lower than about 40° C., and will usually be not higher than about 150° C., e.g., not higher than about 130° C., or not higher than about 110° C.

As a preferred embodiment of the process of the present invention, a thermal cure is used; curing the matrix composition is carried out at a temperature of from about 30° C. to about 150° C.

Irradiation cure or a combination of thermal and irradiation treatment may also be used to cure the matrix composition of the present invention.

The windmill blade produced in the form of a cured, fiber reinforced and toughened epoxy and/or epoxy vinyl ester resin will often have a length of at least about 20 meters, e.g., at least about 30 meters, at least about 35 meters, or even at least about 40 meters.

EXAMPLES

Some of the raw materials used in the following Examples were as follows:

"PEO-PBO" stands for a poly(ethylene oxide)-poly(butylene oxide) diblock copolymer.

"PEO-PBO-PEO" stands for a poly(ethylene oxide)-poly(butylene oxide)-poly(ethylene oxide) triblock copolymer.

D.E.R.® 383 is a liquid epoxy resin (diglycidyl ether of bisphenol A) having an epoxide equivalent weight of 175-185, a viscosity at room temperature of about 9,500 cps and a density of 1.16 gms/cc (commercially available from The Dow Chemical Company).

BDDGE is 1,4-butanediol diglycidyl ether, Polystar® 67 which is a reactive diluent with a viscosity at room temperature of 1 to 6 cps, an epoxide equivalent weight of 165-170 and a density of 1.00 gms/cc.

Jeffamine D230 is poly(oxypropylene diamine), an amine curing agent with a viscosity of 10-15 cps and an amine hydrogen equivalent weight of 60.

Vestamin IPD is isophorone diamine, an amine curing agent with a viscosity at room temperature of 10-20 cps, an amine hydrogen equivalent weight of 44 and a density of 0.9225 gms/cc.

AEP is aminoethylpiperazine, which another amine curing agent.

Preparatory Example A

Preparation PEO-PBO Diblock Copolymer

Part A: Preparation of Catalyzed Initiator

Diethylene glycol monomethyl ether (979.1 grams; 8.16 moles) and potassium hydroxide (29.84 grams; 85 weight percent) were combined in a closed system reaction vessel. The resultant mixture was heated to 110° C. and stripped under vacuum to remove the water (<500 ppm) formed in the reaction.

Part B: Preparation of Butylene Oxide Polymer

Catalyzed initiator (123.9 grams; approximately one mole of diethylene glycol monomethyl ether) prepared in Part A above was heated to 120° C. Butylene oxide (BO) (5355 grams, 74.38 moles) was slowly fed into the reactor such that the reaction temperature was maintained at 120° C. After addition of the BO to the reactor was complete, the mixture was digested until the pressure in the reactor no longer decreased. A portion of the reaction mixture was removed leaving 3,052 grams of product in the reactor. More BO (1,585 grams; 22.01 moles) was slowly added at a rate which maintained the reaction temperature at 120° C. When addition of the BO to the reactor was complete, the mixture was again digested until the pressure leveled off.

Part C: Preparation of Final Butylene Oxide-Ethylene Oxide Block Copolymer

Ethylene oxide (EO) (1,830 grams; 41.59 moles) was slowly added to the butylene oxide block polymer (4,016 grams) prepared in Part B above such that the reaction temperature was maintained at 120° C. When addition of the EO to the reactor was complete, the mixture was digested until the pressure leveled off. Enough glacial acetic acid was then added to the mixture to bring the pH of the mixture to 6-7 (ASTM E70-90). The product was then transferred via a transfer line to a storage container while maintaining the product temperature above 50° C. to prevent solidification of the product in the transfer line. The final product, PEO-PBO block copolymer, had a number average molecular weight of 5,397 as determined by titration of the polymer OH end groups (ASTM D 4274-94, Method D).

Preparatory Example B

Preparation of PEO-PBO-PEO Triblock Copolymer

The basic procedure used to make the PEO-PBO diblock copolymer used in Preparatory Example A above was used in this example to make a PEO-PBO-PEO triblock copolymer except for the following changes. The final PEO-PBO-PEO product contained the following molar ratio of initiator/monomers: 1 mole propylene glycol/56 moles of butylene oxide/62 moles of ethylene oxide.

Part A: Preparation of Catalyzed Initiator

Propylene glycol was used in place of DOWANOL PM. In addition, an aqueous solution of KOH (46 weight percent solids) was used. The aqueous KOH was added to the reactor in an amount to give a final catalyst concentration of 9 weight percent. The water was not removed from the reaction product.

Part B: Preparation of Butylene Oxide Polymer

Butylene oxide was added in two batches. The amount of BO was adjusted so that an intermediate butylene oxide block had a number average molecular weight (Mn) of approximately 1,000. When digestion was complete more of the aqueous KOH (46 weight percent) was added to the reactor so that the final catalyst concentration was approximately one weight percent. The water was removed from the reaction product under vacuum; then additional BO was added to the reactor to afford the final butylene oxide polymer. The final butylene oxide polymer had a number average molecular weight of approximately 3,500.

Part C: Preparation of Final PEO-PBO-PEO Triblock Copolymer

In order to obtain a liquid product, a mixture of ethylene oxide and butylene oxide (80/20 weight percent) was added to the butylene oxide prepared in Part B above. The incorporation of a small amount of butylene oxide in this step helps to disrupt the tendency of PEO to crystallize and form a solid. The amount of the added mixture was adjusted so that the final triblock copolymer had a number average molecular weight of approximately 6,800 g/mole. The final reaction mixture was cooled to 60° C. and then neutralized through a magnesium silicate bed to give the final PEO-PBO-PEO triblock copolymer.

Example 1

Control

A 14 inch by 12 inch aluminum mold lined with DuoFoil was used to prepare a 3.2 mm thick neat resin plaque. A total of about 300 g of epoxy resin composition consisting of 196.9 g of D.E.R.® 383, 32.1 g of BDDGE, 51.8 g of Jeffamine D230, 9.6 g of Vestamin IPD, and 9.6 g of AEP was blended at room temperature and degassed in a vacuum chamber until all foaming subsided. The composition was then poured into the mold at room temperature. The mold was immediately placed in a forced air convection oven programmed to heat up to 70° C., held for 7 hours, then cooled down to ambient with the forced air convection circulating fan running continuously. The resultant plaque was removed from the mold and visually inspected for inclusions, bubbles and defects. The plaque was then machined into test specimens for (i) testing fracture toughness, (ii) tensile properties and (iii) glass transition temperature in accordance with the test procedures described below.

Example 2

Toughened System

A 14 inch by 12 inch aluminum mold lined with DuoFoil was used to prepare a 3.2 mm thick neat resin plaque. A total of about 300 g of a epoxy resin composition consisting of 187 g of D.E.R.® 383, 30.5 g of BDDGE, 49.3 g of Jeffamine D230, 9.1 g of Vestamin IPD, 9.1 g of AEP, and 15 g of the PEO-PBO-PEO triblock copolymer from PREPARATORY EXAMPLE 3 above was blended at room temperature and degassed in a vacuum chamber until all foaming subsided. The composition was then poured into the mold at room temperature. The mold was immediately placed in a forced air convection oven programmed to heat up to 70° C., held for 7 hours, then cooled down to ambient with the forced air convection circulating fan running continuously. The resultant plaque was removed from the mold and visually inspected for inclusions, bubbles and defects. The plaque was then machined into test specimens for testing (i) fracture toughness, (ii) tensile properties and (iii) glass transition temperature in accordance with the test procedures described below.

Glass Transition Temperature (Tg) by Differential Scanning Calorimetry (DSC)

10-20 mg samples were cut from the plaques made as described in Examples 1 and 2 above with a razor blade and placed into open aluminum pans. The pans were crimped and then subjected to a dynamic temperature scan under nitrogen from room temperature to 200° C. at 10° C./min using a TA Model Q100 DSC instrument. The Tg from the 1st scan was recorded. The results are set forth in Table I below.

Tensile Testing

Tensile Tests were performed on an Instron Machine according to ASTM method D638, incorporated by reference herein, on dog-bone shaped samples cut out from the plaques. The tests were conducted at room temperature using a loading rate of 2.5 mm/min. The load cell recorded the load and an extensometer was used to measure the strain. These were used to calculate the tensile modulus, tensile strength, tensile strain at break, and tensile strain at yield. The results are set forth in Table I below.

Fracture Toughness

Samples were tested for Mode I fracture toughness using the compact tension specimen geometry in accordance with ASTM D 5045-93, which is incorporated by reference herein in its entirety. Samples were water jet cut to appropriate dimensions. Water jet cutting was used to avoid cracking and leaving the test specimens with almost no residual stress. A starter crack was very carefully introduced by gently tapping a razor blade cooled with dry ice into the chevron notch in the specimen. Specimens were loaded on an electro-mechanical Instron 5566 test frame by means of a clamp and dowel pin and loaded at a constant displacement rate. Load and stroke data were recorded during the test using a computer controlled data acquisition system. About 5-8 specimens were tested for each sample plaque the results are set forth in Table I below.

TABLE I

| | Example 1 (control)* | Example 2 |
|---|---|---|
| DSC $T_g$ 1 (deg C.) | 78 | 75 |
| Tensile Yield Strength, MPa | 67 | 59 |
| Tensile modulus, Gpa | 3 | 2.8 |
| Tensile Elongation @ Yield, % | 4.6 | 4.4 |
| Tensile Elongation @ Break, % | 9.7 | 13.9 |
| Fracture Toughness (Mpa $M^4 0.5$) | 1.05 to 1.15 | 2.82 to 2.92 |

*Not an example of the present invention.

As can be see from Table I above, the fracture toughness and strain at break for the toughened composition is much higher than that of the control indicating superior toughness of the toughened composition. This toughness enhancement in the toughened system is while maintaining and not compromising on key thermal properties like the glass transition temperature and other mechanical properties like tensile modulus as can be seen in the Table I.

Viscosity Measurements

The formulations used for the control composition and the toughened composition for viscosity testing set forth below were the same as those that were used in Examples 1 and 2 above.

Parallel Plate Rheometry using the ARES Rheometer was used to track the viscosity build up as a function of time for the formulations (toughened and untoughened) subjected to the same temperature profile. The viscosity build up is a function of the reactivity of the system, a lower viscosity build up indicating reduced reactivity. Standard 40 mm plates were used and the sample, inserted between the plates was subjected to constant frequency of 1 Hz. The samples were subjected to the following temperature profile: 40° C. for 1 hour followed by a temperature ramp to 70° C. at 0.25° C./minute. This is similar to the temperature profile followed during the infusion used for windmill blades.

The processing benefits of the present invention ban be appreciated by reviewing FIG. 1. As can be see from FIG. 1 the viscosity build up of the toughened system (lower curve) is slower than that of the control (middle curve) indicating reduced reactivity of the toughened system. Also note from FIG. 1 the initial viscosity of the control and toughened system is the same. This is not the case with most toughening agents like CTBN (carboxyl-terminated polybutadiene-acrylonitrile copolymer) etc. where addition of these additives causes a sharp rise in the viscosity, thereby causing processing difficulties.

Although the present invention has been described in considerable detail with regard to certain versions thereof, other versions are possible, and alterations, permutations, and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described the present invention, it will be understood to those of ordinary skill in the art that the methods of the present invention can be carried out with a wide and equivalent range of conditions, formulations, and other parameters without departing from the scope of the present invention or any embodiments thereof.

What is claimed is:

1. A windmill blade which comprises reinforcing fibers in a resin matrix, wherein the matrix is made from a matrix composition which comprises (a) one or more epoxy resins, (b) one or more reactive diluents, and (c) at least one amphiphilic block copolymer which comprises at least two different polyether blocks and is present in the composition in an amount of from about 0.5% to about 10% by volume, based on a total volume of the matrix composition;
  wherein the amphiphilic block copolymer, component (c), comprises at least one polyether block A and at least one polyether block B;
  wherein the polyether block A is independently selected from a polybutylene oxide block, a polyhexylene oxide block, a polydodecylene oxide block, and a polyhexadecylene oxide block; and
  wherein the polyether block B is independently selected from a polyethylene oxide block, a polypropylene oxide block, and a poly(ethylene oxide-co-propylene oxide) block;
  wherein a weight ratio of the polyether block A to the polyether block B in the amphiphilic block copolymer, component (c), is from about 10:1 to about 1:10;
  wherein the epoxy resin, component (a), is present in an amount of from about 30% to about 95% by volume, based on the total volume of the matrix composition;
  wherein the reactive diluent, component (b), is present in an amount of from about 5% to about 25% by volume, based on the total volume of the matrix composition; and
  wherein the amphiphilic block copolymer, component (c), is present an amount of from about 1% by volume to about 5% by volume, based on the total volume of the matrix composition.

2. The windmill blade of claim 1, wherein the matrix composition provides a fracture toughness of an article made therefrom which is higher than a fracture toughness of an article made from a comparative composition which has the same initial viscosity as the matrix composition and comprises only the epoxy resin, component (a) and the reactive diluent component (b).

3. The windmill blade of claim 2, wherein the fracture toughness of the article made from the matrix composition is at least about 150% of the fracture toughness of the article made from the comparative composition.

4. The windmill blade of claim 3, wherein the viscosity of the matrix composition increases at a rate which is about the same or lower than a rate at which the viscosity of the comparative composition increases under the same conditions.

5. The windmill blade of claim 1, wherein the amphiphilic block copolymer, component (c), comprises at least one block A of poly(butylene oxide) and at least one block B of poly(ethylene oxide); or wherein the amphiphilic block copolymer, component (c), comprises one or both of a poly(ethylene oxide)-b-poly(butylene oxide) block copolymer and a poly(ethylene oxide)-b-poly(butylene oxide)-b-poly(ethylene oxide) block copolymer.

6. The windmill blade of claim 1, wherein the amphiphilic block copolymer, component (c), comprises a poly(ethylene oxide)-poly(propylene oxide) block copolymer comprising from about 5% to about 30% by weight of one or more poly(ethylene oxide) blocks and from about 70% to about 95% by weight of one or more poly(propylene oxide) blocks, based on a total weight of the block copolymer.

7. The windmill blade of claim 6, wherein the block copolymer comprises not more than about 20% by weight of the one or more poly(ethylene oxide) blocks.

8. The windmill blade of claim 1, wherein the at least one amphiphilic block copolymer has a number average molecular weight (Mn) of from about 1,000 to about 30,000.

9. The windmill blade of claim 1, wherein the epoxy resin, component (a), is selected from polyglycidyl ethers of polyhydric alcohols, polyglycidyl ethers of polyhydric phenols, polyglycidyl amines, polyglycidyl amides, polyglycidyl imides, polyglycidyl hydantoins, polyglycidyl thioethers, epoxidized fatty acids or drying oils, epoxidized polyolefins, epoxidized di-unsaturated acid esters, and epoxidized unsaturated polyesters.

10. The windmill blade of claim 9, wherein the epoxy resin, component (a), comprises at least one diglycidyl ether of a bisphenol compound; and wherein (a) has an epoxide equivalent weight of from about 100 to about 3,000.

11. The windmill blade of claim 1, wherein the epoxy resin, component (a), has a viscosity at 25° C. of at least about 1,000 cps; wherein the reactive diluent, component (b), has a viscosity at 25° C. which is not higher than about 100 cps; wherein the matrix composition has a viscosity at 25° C. which is not higher than about 1,000 cps.

12. The windmill blade of claim 1, wherein the matrix composition further comprises one or more curing agents.

13. The windmill blade of claim 1, wherein the reinforcing fibers comprise one or more of carbon fibers, graphite fibers, boron fibers, quartz fibers, aluminum oxide fibers, glass fibers, silicon carbide fibers, and aramid fibers; and wherein the reinforcing fibers are present in an amount of from about 5% to about 80% by weight, based on a total weight of reinforcing fibers plus matrix.

14. The windmill blade of claim 1, wherein the windmill blade is at least about 20 meters in length.

* * * * *